United States Patent
Nagarajan (10) Patent No.: US 8,508,786 B2
(45) Date of Patent: Aug. 13, 2013

(54) SYSTEM AND METHOD OF BILLING FOR SCANNING SERVICE COSTS

(75) Inventor: Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1037 days.

(21) Appl. No.: 12/464,326

(22) Filed: May 12, 2009

(65) Prior Publication Data

US 2010/0290094 A1 Nov. 18, 2010

(51) Int. Cl.
*G06K 15/00* (2006.01)
*G03G 21/02* (2006.01)
*G06F 21/00* (2006.01)

(52) U.S. Cl.
USPC ......... 358/1.18; 358/1.9; 358/1.13; 358/1.15; 399/79; 705/51; 705/52

(58) Field of Classification Search
USPC ................... 358/1.2, 1.9, 1.13, 1.15; 705/51, 705/52
See application file for complete search history.

(56) References Cited

U.S. PATENT DOCUMENTS

| | | | | |
|---|---|---|---|---|
| 3,989,930 | A * | 11/1976 | Sohm | 377/8 |
| 5,850,474 | A | 12/1998 | Fan et al. | |
| 6,052,547 | A * | 4/2000 | Cuzzo et al. | 399/79 |
| 6,240,205 | B1 | 5/2001 | Fan et al. | |
| 7,593,120 | B2 * | 9/2009 | Kitora et al. | 358/1.13 |
| 2007/0088640 | A1* | 4/2007 | Hyakutake et al. | 705/34 |
| 2008/0079967 | A1* | 4/2008 | He | 358/1.9 |
| 2009/0099980 | A1 | 4/2009 | Ni et al. | |
| 2009/0265286 | A1 | 10/2009 | Nagarajan | |

* cited by examiner

*Primary Examiner* — Richard Zhu
(74) *Attorney, Agent, or Firm* — Fay Sharpe LLP (57) ABSTRACT

A system and method of billing for scanning service costs is provided to examine content of a page and apply a cost function to approximate the cost of scanning the page. Examining the page includes detecting an object in the page, determining a type of the detected object, determining an approximate file size of the page, and determining an approximate area of coverage of the detected object within the page. A usage profile of each type of detected object is calculated and stored. The cost function uses the detected object, the approximate file size, the approximate area of coverage, and a weight value associated with the type of detected object to approximate the cost of the page. When costs are calculated over a period of time, the weight value of each type of detected object may be adjusted based on the usage profile for each type of detected object.

18 Claims, 5 Drawing Sheets

SYSTEM AND METHOD OF BILLING FOR SCANNING SERVICE COSTS

BACKGROUND

1. Technical Field

The present disclosure is generally related to billing for scanning costs, and, in particular, to a system and method of billing for scanning service costs by examining and weighting the content of pages that are scanned.

2. Description of Related Art

In order to scan a document at a specific cost or file size, users today have to make several imaging and quality selections in order to reach the desired price or file size. Users generally have to use a trial and error process working through multiple tabs to adjust the scan settings to reach the desired price or file size. Manual scan controls which affect file size, and thus cost, include, but are not limited to, image options, image enhancements, file formats, scan presets, quality and resolution. A user can reduce the file size of a scan by manually altering color, original type, subtype selection, saturation, lighter/darker contrast, and auto background suppression selections.

The difficult trial and error process of adjusting multiple scan controls in order to reach a desired cost or file size has lead to charging for scanning based upon printing/copying modes, i.e. the user may choose either a black and white or a color scan. This approach involves charging a "per click" fee of a fixed amount when a user scans a black and white page, and charging a different amount for the "per click" fee when scanning a color page. This is referred to as the "one size fits all billing approach" and is simply billing one fee for scanned black and white pages and another fee for scanned color pages, regardless of the content in the scanned page. For example, the "per click" fee may be $0.01 (U.S) per black and white printed page and $0.08 (U.S.) per color printed page.

Another approach is to determine the cost of the scan based upon the activity of a scanning device or output hardware. U.S. Pat. No. 6,112,039 discloses a billing-for-scanning system which includes an audit system for determining how much credit a particular user has to expend on a particular function. For example, if a user requests fifty scans or prints, the audit system will, before processing each image, determine if the particular user has enough credit to pay for the output image. The pricing of a particular job may be determined by the counts of activities of the scanner or output hardware.

The prior art does not generally take into account the objects that are in the page or how those objects are distributed in the page. For example, there are several types of black and white and/or color objects that may be on any page. Some of the types of objects are: monochrome contone objects, color contone objects, monochrome text objects, color text objects, monochrome line art objects, color line art objects, monochrome graphic objects, color graphic objects, monochrome low frequency halftone objects, color low frequency halftone objects, monochrome high frequency halftone objects, color high frequency halftone objects, monochrome solid fill objects, and color solid fill objects. The service cost of scanning pages is a function of these object types scanned on a machine since its last service. For example, the service cost for scanning color solid fill objects will be higher than printing monochrome text objects. The presence or absence of these objects affects the file size of a scan and thus the service cost of scanning pages.

SUMMARY

According to an embodiment of the present disclosure, a method of billing for scanning service costs of an output device is disclosed. The output device is adapted to scan documents including one or more pages. The method includes using a computing device operably coupled with the output device to examine content of each page in the documents. The examining includes electronically detecting one or more objects in the page, electronically determining a type of each detected object within the page, electronically determining an approximate file size of the page, and electronically determining an approximate area of coverage of a detected object within the page. The method also includes using the computing device to calculate a usage profile of each type of detected object using a calculation module and electronically storing the usage profile of each type of detected object in a memory associated with the computing device. The method also includes using the computing device to apply a cost function to approximate a cost of scanning the page using the one or more detected objects, the determined approximate file size of the page, the determined approximate area of coverage of the one or more detected objects, and a weight value. The weight value is associated with the type of the one or more detected objects, wherein the approximate cost of scanning for each page scanned by the output device is determined by the computing device.

According to another embodiment of the present disclosure, a billing system for scanning service costs of an output device is disclosed. The output device is adapted to scan documents having one or more pages. The billing system includes a computing device electronically coupled with the output device and adapted to process scanned documents. The computing device includes an examination module configured to examine content of a page. The examination module includes a detection module, a file size module, and a coverage module. The detection module is configured to detect one or more objects in the page and a type of the one or more objects. The file size module is configured to determine an approximate file size of the page. The coverage module is configured to determine an approximate area of coverage of a detected object within the page. The computing device also includes a calculation module, configured to calculate a usage profile of each type of detected object, and a memory for storing the usage profile of each type of detected object. The computing device also includes a cost calculation module configured to apply a cost function to approximate a cost of scanning the page using the detected object, the determined approximate file size of the page, the determined approximate area of coverage of the detected object, and a weight value. The weight value is associated with the type of the one or more detected objects.

According to yet another embodiment of the present disclosure, a method of billing for scanning service costs of a multi-function device is disclosed. The multi-function device is adapted to scan documents comprising one or more pages. The method includes using a computing device operably coupled with the multi-function device to examine content of each page in the documents. The examining includes electronically detecting one or more objects in the page, electronically determining a type of the one or more detected objects within the page, electronically determining a number of pixels of the one or more detected objects within the page, and electronically determining an approximate file size of the page based on the determined number of pixels of the one or more detected objects within the page. The method also includes using the computing device to calculate a usage profile of each type of detected object. The usage profile of each type of detected object is based on a calculated number of times the object is scanned by the multi-function device over a period of time. The method also includes electronically storing the usage profile of each type of detected object in a memory associated with the computing device and using the computing device to generate a message to a user of the multi-function device based on one or more of the approximate file size and the stored usage profile. The method also includes using the computing device to apply a cost function to approximate a cost of scanning the page using the one or more detected objects, the determined approximate file size of the page, the determined number of pixels of the one or more detected objects, and a weight value. The weight value is associated with the type of the one or more detected objects, wherein the approximate cost of scanning for each page scanned by the scanning device is determined by the computing device.

DETAILED DESCRIPTION

The types of objects scanned on pages affect a user's or customer's service costs. For example, a user who scans a large plurality of high frequency halftone images is more likely to call for service more frequently as compared to a user who scans few high frequency halftone images and/or plain text images. In order to improve and customize the system and method of billing for scanning service costs, this disclosure provides a method of detecting objects, calculating their usage (i.e., number of times they are scanned), determining a corresponding approximate file size per page scanned, weighting the detected objects, and changing the service costs associated with each object type based on usage data of each object type and the approximate file size per page scanned.

Figure 1A:
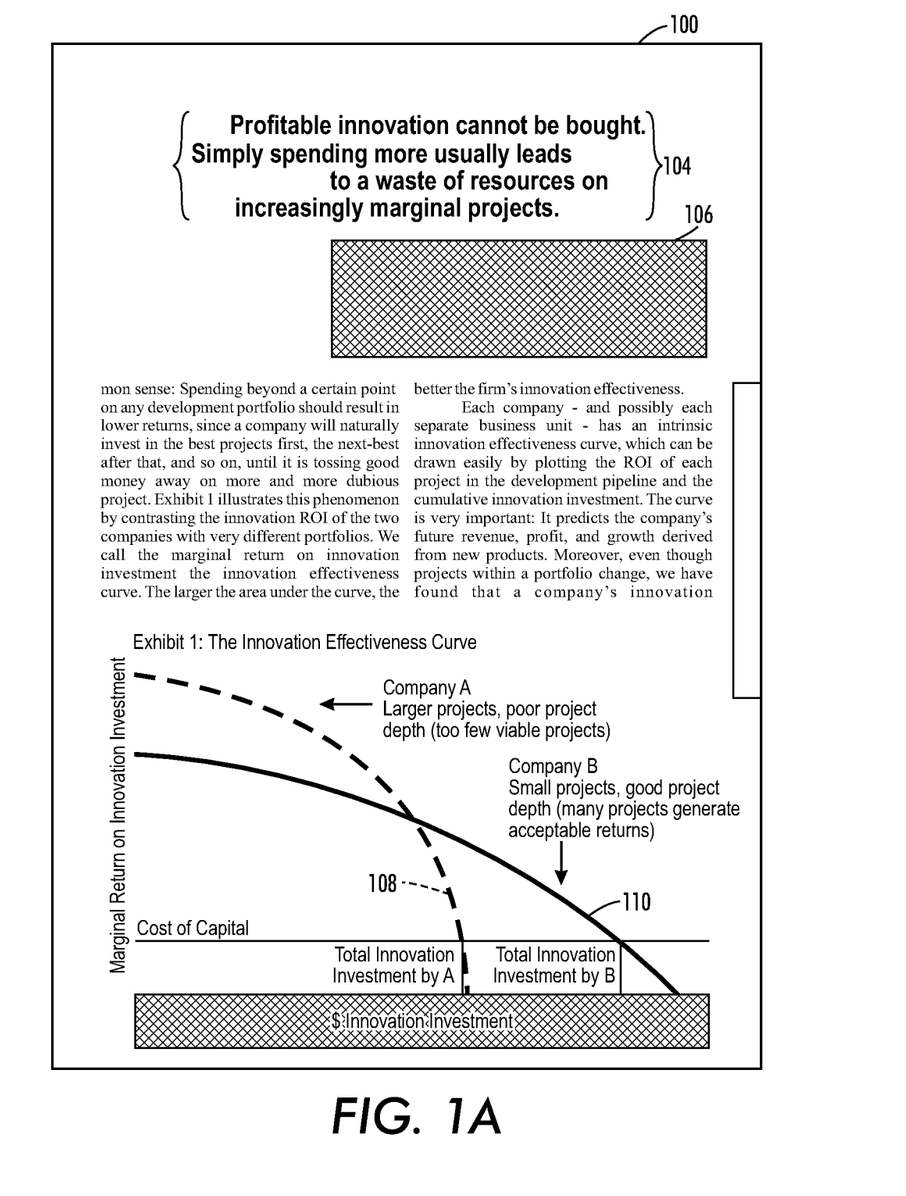
FIGS. 1A and 1B show graphic representations of pages with text and objects therein in accordance with the present disclosure.
Figure 1B:
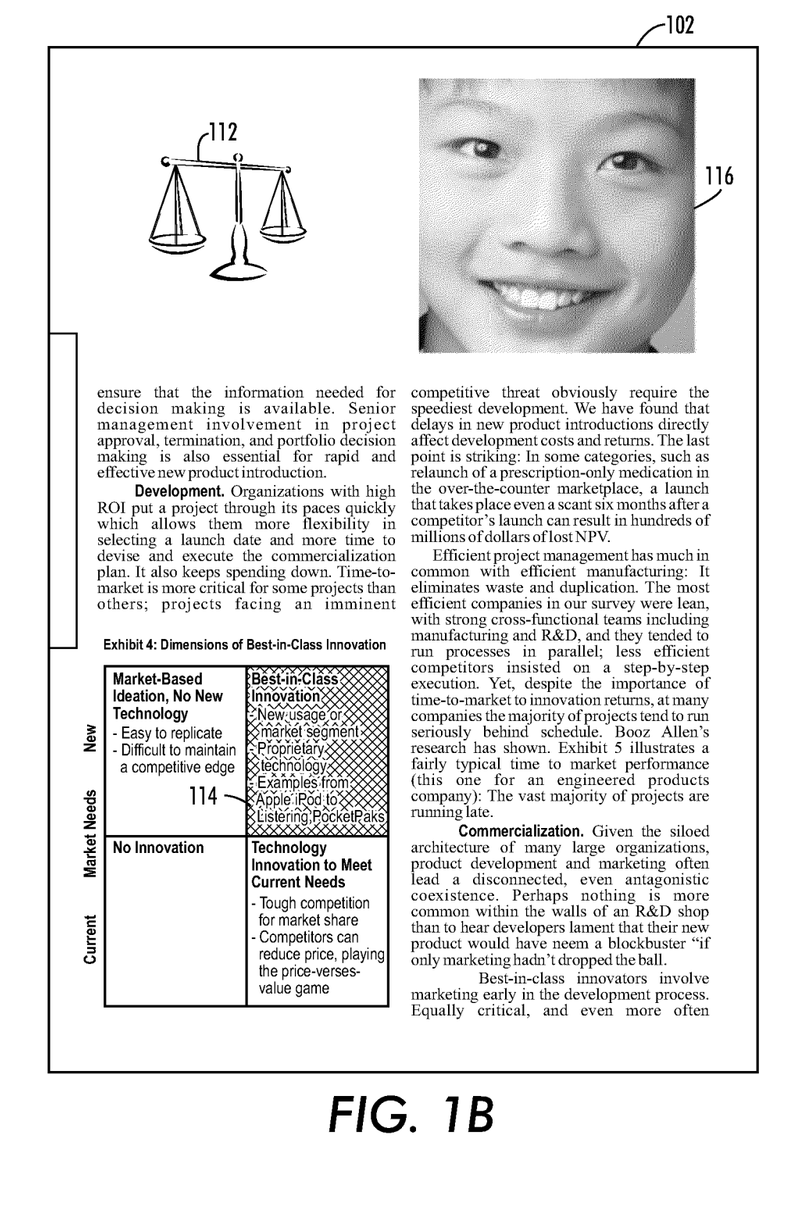

Referring now more particularly to the drawings. FIGS. 1A and 1B show pages 100 and 102, respectively. Page 100 includes color text object 104, color solid fill object 106, and color line art objects 108 and 110. Page 102 includes color graphic object 112, color low frequency halftone object 114, and color high frequency halftone object 116. The remaining objects on the pages 100 and 102 are monochrome text or line objects (i.e., black or of a single color). Pages 100 and 102 illustrate examples of pages that may be scanned by a scanning device. Generally, at least one page to be scanned is sent to an output device such as a scanner or a printing system including scanning functionality such as multi-function device (MFD) that includes at least the capability to print, copy, and/or scan documents. The types of objects that may be included in a page are: monochrome contone objects, color contone objects, monochrome text objects, color text objects, monochrome line art objects, color line art objects, monochrome graphic objects, color graphic objects, monochrome low frequency halftone objects, color low frequency halftone objects, monochrome high frequency halftone objects, color high frequency halftone objects, monochrome solid fill objects, and color solid fill objects.

In order to determine each type of object, a number of techniques may be performed on the image data. In some instances, for each image the number of pixels per edge may be determined (e.g., counted) to thus assist in detecting the type of object in a page. For example, a higher number of edge pixels may indicate that an object comprises text/line art content, while lower number of edge pixels may indicate that an object comprises continuous tone image content.

For example, "monochrome" is generally defined for an object or image as comprising pixels having a range of shades corresponding to a single color, such as black toner (or ink). Grayscale images or objects, i.e., having shades of black (and white), are examples monochrome contone objects. "Color," on the other hand, is generally defined as comprising more than one color. Color contone objects may be defined as objects comprising pixels having a range of shades corresponding to more than one color. For example, in a CMYK color system, a color contone object or image may contain cyan and magenta toner (or ink). Monochrome text objects are defined as text (e.g., alphanumeric characters in English or any other textual or character based representations in other languages) comprising pixels in a single color, such as black. Color text objects are defined as objects or text whose pixels are determined to use more than one color, such as cyan and yellow, which generally produce another color that is visible to the human eye, such as green. Similarly, monochrome line art objects are defined as line objects that are a single color, while color line art objects are defined as line objects that use more than one color.

Monochrome graphic objects are defined as objects having a larger number of pixels arranged to form an edge defining a complex geometric shape and comprising a single color. Color graphic objects are defined as objects comprising a large number of pixels arranged to form at least one edge and comprising more than one color, such as color graphic object 112, for example.

The frequency of the pixels, or the number of times pixels are provided in an image, determines if an image or objects is "low frequency" or "high frequency." Thus, monochrome low frequency halftone objects comprise objects having a smaller number of pixels of halftone image data in a single color, while monochrome high frequency halftone objects comprise objects having a larger number of pixels of halftone image data in a single color. Color low frequency halftone objects comprise objects having a smaller number of pixels of halftone image data in more than one color, while color high frequency halftone objects comprise objects having a larger number of pixels of halftone image data in more than one color. An example of a color high frequency halftone object may be a picture or a photograph, such as shown by object 116 on page 102, for example.

Generally, solid fill objects are defined as objects or images comprising a smaller number of pixels arranged to form a plurality of connected edges. Thus, monochrome solid fill objects comprise objects having a smaller number of pixels forming a plurality of connected edges in a single color, while color solid fill objects are objects having a smaller number of pixels forming a plurality of connected edges in more than one color. An example of a solid fill objects may be an area with the same color throughout, such as shown by color solid fill object 106, for example. As further described below, any number of techniques may be used to determine and/or categorize the type of object detected in a page.

A page may take many forms, e.g., pages 100 and 102. A page may be a scanned page, an image of a page, a page description language page, a printed page, a copied page, a computer memory based page, a hard-drive based page, a raster page, a vector graphics page, or the like. Additionally or alternatively, pages 100 and 102 may be a representation of a page in printed form (e.g., printed pages).

Because there is a correlation between the service cost associated with a particular scanned page and the page content (e.g., the objects in the page), examining the content of each page to be output allows for customizable system and method of billing. As previously noted, the additional service costs for scanning color image data may include the type of object scanned. For example, scanning a 1×1 inch object on a page may have higher service cost if the object were a color high frequency halftone object as compared to a color low frequency halftone object or a monochrome line art object. Thus, the type of object(s) and an approximate area of coverage of the object(s) in each page should be considered. The "area of coverage" of an object may be a relative or absolute measurement. Also, the "area of coverage" of an object may be the number of pixels of the object and/or the area of the object. Additionally or alternatively, to determine the approximate area of coverage of an object in pages 100 and 102, the method may count the number of pixels of that object. In an embodiment, the total area of coverage of color pixels on a page as well as the area of coverage of individual objects may be determined.

Prior art systems have only two mutually exclusive modes for scanning page content. The prior art systems either scan color pages in "full color" or in "monochrome only". In the full color mode, all of the color objects in the page are scanned into a file "as-is." In the monochrome only mode, all of the color objects are converted to monochrome objects before (or simultaneously with) the production of the scanned page file.

These two methods of the prior art systems may be used in conjunction with any scanning technology. Referring to FIGS. 1A and 1B, pages 100 and 102 may be scanned using the prior art systems. However, many entities involved in the color scanning industry bill the costs of scanning a page based on which mode (i.e., full color or monochrome only) is utilized to scan the page regardless of the content of the page (e.g., types of objects on the page). By way of example, using the prior art systems, pages 100 and 102 would be billed at the same rate when scanned using the full color mode despite page 102 including significantly more complex color objects relative to page 100.

Because of the significant file size and thus price difference between scanning pages using the full color mode versus using the monochrome only mode, many system administrators prevent users from scanning in color or restrict their use. Scanning color pages generally has an increased file size per page as compared to scanning monochrome pages and also has an increased file size per page compared to monochrome pages. However, different types of color objects have different effects on the aggregate file size. For example, scanning a page having color text with the remainder of the page being in monochrome does not generally incur additional storage space as compared to scanning a page in monochrome only. Additionally, color text objects require a smaller file size as compared to color graphic objects or color high or low frequency halftone objects. Furthermore, scanning a color object with fewer colors reduces the file size of the scan as compared to scanning the object in full color.

In the prior art method discussed above, pages 100 and 102 would be billed on a "per click" fee resulting in the two pages being billed at about the same fee when scanned, or at exactly the same fee. However, what the prior art method fails to account for is the correlation of the file size associated with a particular scanned page to the page content (e.g., the objects in the page). For example, a 1×1 inch object on a scanned page may require a relatively large file size if the object were a color high frequency halftone object as compared to a color low frequency halftone object or a color line art object. The reasons for the additional file size may be at least partially due to the bit depth of each object or the dots per inch (DPI). Bit depth refers to the number of bits required to store information about each dot (or pixel). For example, black and white objects only have one bit of data associated with each dot. The dot is either black or white. For 256 color objects, there are 8 bits of data associated with each dot. The more bits of data required for each dot, the larger the file size of that object. DPI, on the other hand, is a measure of the number of physical dots associated with an object. A higher DPI increases the file size. Thus, the file size of any image object is at least partially related to the number of dots (pixels) making up the object and the number of bits required to store information of each dot. The bit depth and DPI may differ significantly between the different types of objects listed above, and thus the file size of the objects listed above may also differ significantly.

Since the bit depth and DPI, and thus the file size of various objects is related to the type of object, it is important to detect, separate and classify the various objects on a particular page. An auto-windowing technique is described in commonly owned U.S. Pat. No. 5,850,474 and U.S. Pat. No. 6,240,205, the entire contents of both of which are incorporated herein by reference. Using an auto-windowing or similar technique, the content of the scanned page may be examined and image data on the scanned page may be detected. The detecting step may include a micro-detection step, wherein each pixel on the page is examined and a preliminary determination is made as to the image type of the pixel, and a macro-detection step, wherein the results of the micro-detection step are used to determine which pixels determine the edge of the image and which pixels belong to the image. The image data may then be separated into at least one window. The image data within each window is then classified as a particular type of image data. Using this auto-windowing and MRC segmentation described in U.S. Pat. No. 5,850,474 and U.S. Pat. No. 6,240,205, one can differentiate text and line art content from windowed objects by detecting image objects on the page, windowing similar objects and classifying those objects as a particular type of object. Simple file estimation of each mask and image object can then be performed and aggregated to approximate the overall file size of the scanned page.

Further, the frequency or number of times an object is scanned, for example, between service periods, by an output device (e.g., scanning device) or MFD may also affect the service cost. Therefore, as provided in the disclosed method further described with respect to FIG. 2, automatically collecting such information in the field would be beneficial. In this case, "automatically" collecting information refers to collecting information at the time an object is to be output. For example, as documents are scanned in an output device or MFD, the object types in each page will be recorded. The number of each object type(s) may then be collected after determining the type of object. A weight value for each object type is used with the cost function to calculate the cost of scanning such pages.

Figure 2:
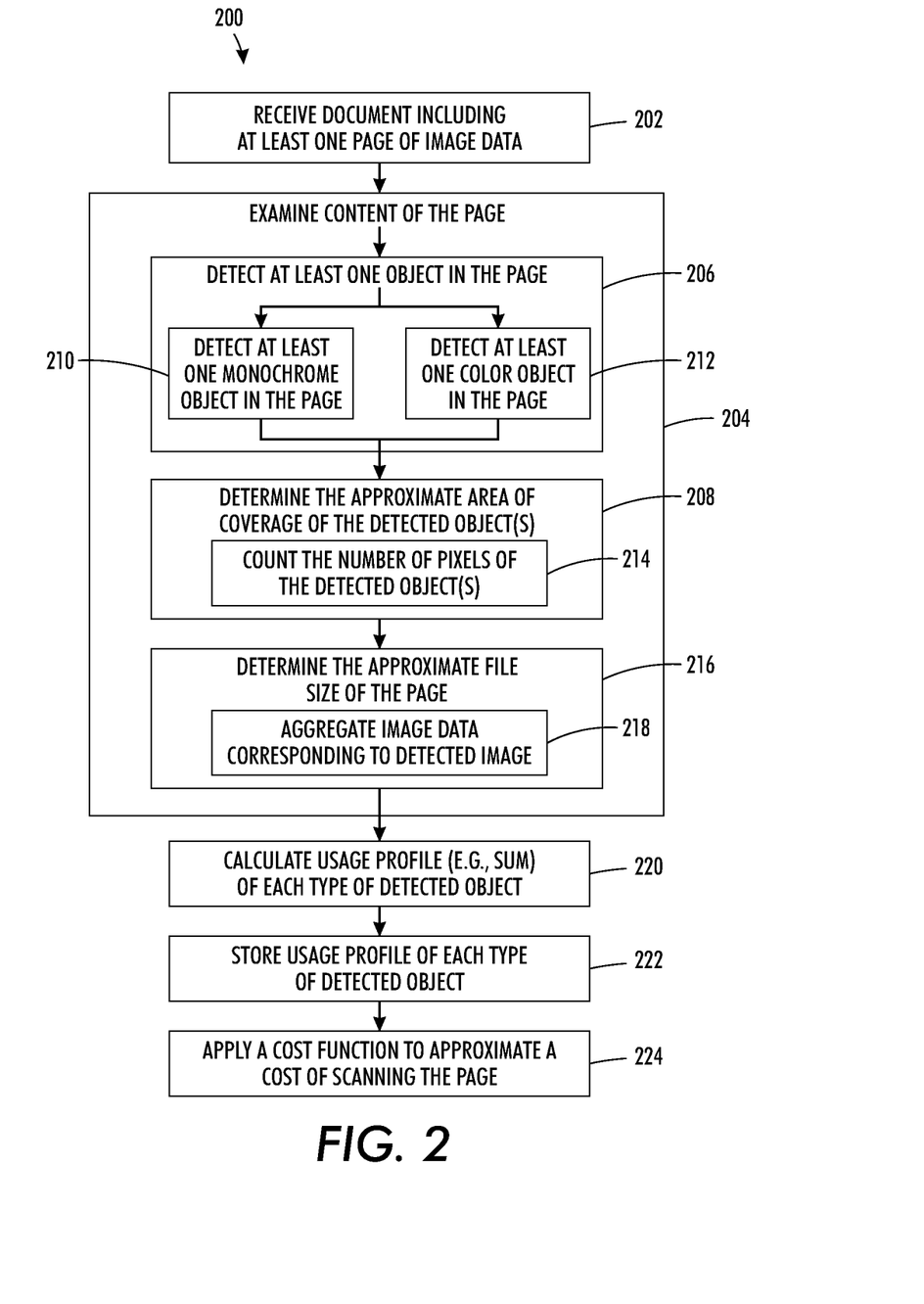
FIG. 2 is a flow chart diagram illustrating a method of billing for scanning service costs in accordance with the present disclosure.

FIG. 2 is a flow chart diagram illustrating a method 200 of customizing scanning service costs. The method 200 begins at step 202 by receiving a document comprising at least one page of image data. The page of image data in step 202 is representative of any type of page (e.g., pages 100 and 102 of FIGS. 1A and 1B) and may include a variety of objects to be detected and used by method 200; however, method 200 may use a page that includes any combinations of objects or no objects (e.g., text). With reference to page 402 of FIG. 4, for example, the page may include objects such as monochrome contone object 404, monochrome text object 406, monochrome line art object 408, monochrome graphic object 410, monochrome low frequency halftone object 412, monochrome high frequency (abbreviated as "freq." throughout FIG. 4) halftone object 414, monochrome solid fill object 416, color contone object 418, color text object 420, color line art object 422, color graphic object 424, color low freq. halftone object 426, color high freq. halftone object 428, or color solid fill object 430. Step 204 may examine content of the received page and include steps 206, 208, and 216. Step 206 may detect at least one object in the received page while step 208 may determine the approximate area of coverage of the detected object(s), and step 216 may determine approximate file size of the received page. The at least one object in the page that is referred to in step 206 may include one or more objects, such as those noted above.

As noted, step 206 includes steps 210 and 212. Step 210 may detect at least one monochrome object in the received page (e.g., one of objects 404 through 416), and step 212 may detect at least color object in the received page (e.g., one of objects 418 through 430). Step 212 may include additional steps (not shown) such as steps that may detect at least one color contone object, detect at least one color text object, detect at least one color line art object, detect at least one color graphic object, detect at least one color low frequency halftone object, detect at least one color high frequency halftone object, and/or detect at least one color solid fill object. Thus, generally speaking, step 212 may detect the color object and its specific type.

Method 200 may then determine the approximate area of coverage of the detected object (and/or objects) of step 206 in step 208. A way method 200 may determine the approximate area of coverage of the detected object(s) (e.g., on of the objects 404 through 430) is to count the number of pixels of the detected object in item 214, as discussed hereinabove (e.g., ripping and/or during auto windowing).

Method 200 may then determine the approximate file size of the received page in step 216. A way method 200 may determine the approximate file size of the received page is to aggregate image data (e.g., DPI, bit depth) corresponding to the detected object (and/or objects) of step 206 in step 218, as discussed hereinabove (e.g., auto-windowing and/or MRC segmentation).

After an object is examined and detected and the approximate area of coverage of the detected object and the approximate file size are determined in steps 204-218, the usage profile of each type of detected object is calculated. The "usage profile" of an object is defined as the number of times an object is scanned by an output device or MFD. The calculation may include counting the number of times a certain type of object is scanned, i.e., determining a sum. For example, the received page in step 202 may include two color line art objects 108 and 110 as shown in page 100. Thus, the usage profile for color line art objects would include at least two more counts added to or summed with a pre-existing total. The total of an object's usage profile is defined as the calculated number of times the object is scanned over a period of time. The total may be zero or higher. The period of time may be defined as the time period between service calls or visits by a customer service technician, engineer, or the like. After the usage profile of each type of detected object(s) (e.g., of step 206) is calculated in step 220, the usage profile is stored, e.g., such as in a memory, in step 222.

Method 200 may then apply a cost function in step 224 to determine or approximate a cost of scanning each page by the output device. The cost function uses the at least one detected object (e.g., of step 206), the determined approximate area of coverage of the at least one detected object, the determined approximate file size of the scanned page, and a weight value. The weight value is associated with each type of detected object. The weight value is defined as a value that is associated with each type of object to affect the amount or weight the object has on the service cost. In an embodiment, a weight value is only associated with color objects (not monochrome objects). The weight value of each type of object may be initially set at a standard and adjusted based on the calculated and stored usage profile of the types of detected objects scanned (e.g., of steps 220 and 222). The weight value of each object may be increased or decreased based on its usage profile. For example, after a period of time, a weight value associated with color graphic objects may be decreased, while the weight value associated with color high frequency halftone objects is increased. The weight values are used to determine a weighted average and then associated with a weighting of color area coverage to determine a cost C per page. Thus, the cost of scanning a page may be increased or decreased based on a calculated usage profile of selected (scanned) object types, or, in another embodiment, the cost of scanning a page may be customized based on a calculated usage profile.

Figure 3:
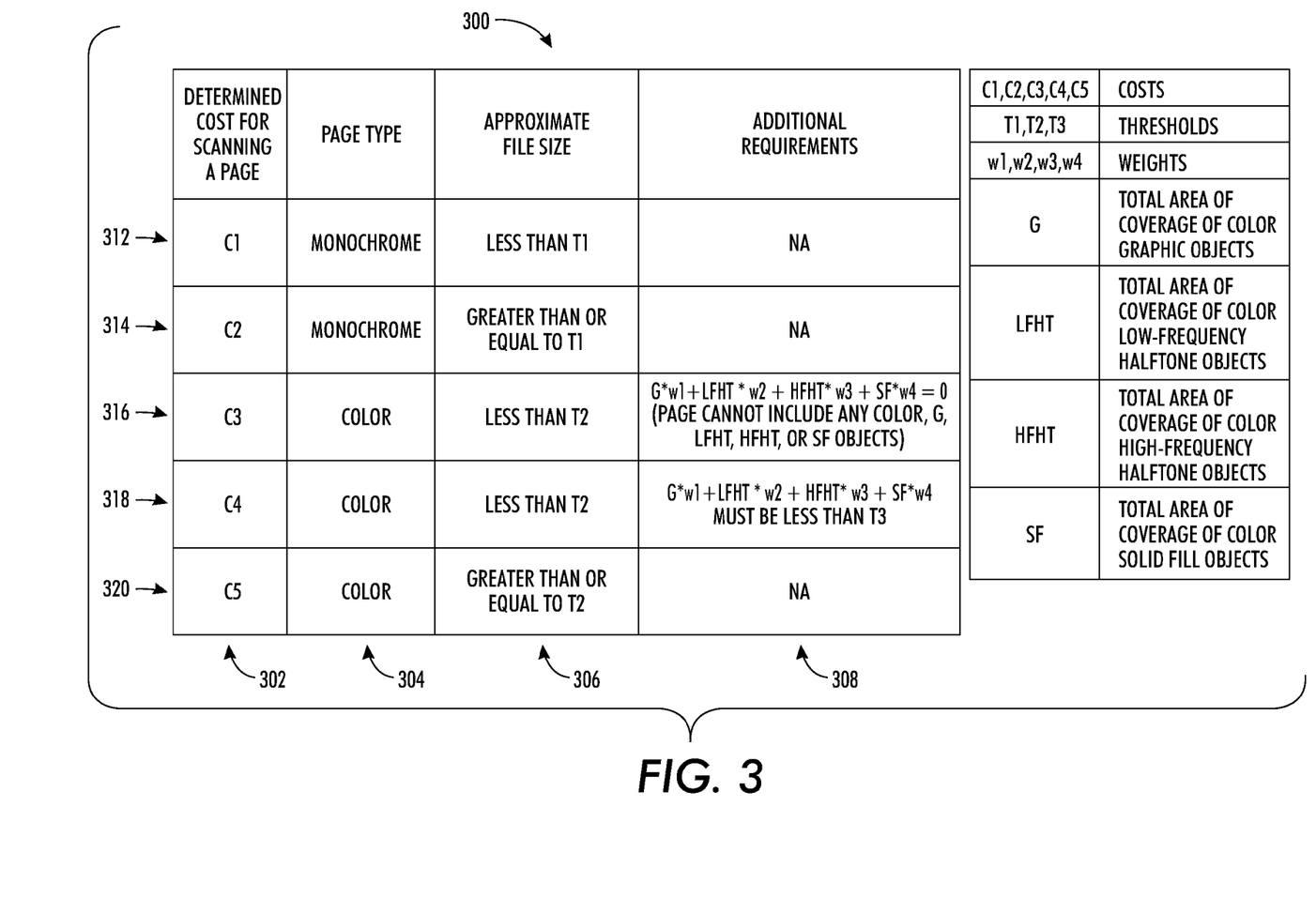
FIG. 3 is a chart depicting several approximated costs that may be used by the method of FIG. 2 to account for the service cost of scanning a page in accordance with the present disclosure.

The cost function referred to within step 220 may be the one as depicted in FIG. 3. Chart 300 depicts several costs that can be used by method 200 of FIG. 2 to approximate the service costs of scanning a page. Chart 300 illustrates five determined service costs for scanning a page in column 302 that includes costs C1, C2, C3, C4, and C5. Costs C1, C2, C3, C4, and C5 may include the service, may be the service cost, may include other costs, may be used to calculate a few and/or otherwise can be a costs that account (either exactly, approximately, or by estimation) for the service cost of scanning a page. Generally, costs C1-C5 are determined based on at least the detected object and the approximate file size of the scanned page. As noted above, in an embodiment, a weighting value or factor W may be used to determine a weighted average for color objects. Thus, in an embodiment, the cost C of a color object may be determined based on at least the detected object, the approximate file size the scanned page, and a weight value associated with the detected object.

Cost C1, as depicted in row 312 of FIG. 3, may be used to account for the page service cost when a page is a monochrome page wherein the approximate file size of the page is less than a threshold T1. Monochrome objects may be detected during step 210 of FIG. 2, for example. Alternatively, cost C2 may also be used to account for the service cost when the page is exclusively monochrome wherein the approximate file size is greater than or equal to threshold T1, as shown in row 314. Thus, cost C1 is used to capture monochrome pages comprising less content, i.e., low area coverage, while cost C2 is used to capture monochrome pages comprising more content, i.e., high area coverage.

Costs C3, C4, and C5 apply to scanned pages that are detected to include color objects for output. In an embodiment, the page may also contain significant amount of monochrome objects or a plurality of types of color objects. Cost C3 is used to account for service costs when there are color objects in the page and wherein the exported file size is less than a threshold T2. Also, to use cost C3, the page may not include any color graphic objects, color low frequency halftone objects, color high frequency halftone objects, or color solid fill objects, as depicted by the formula shown in row 316, column 308: $G*W1+LFHT*W2+HFHT*W3+SF*W4=zero$. This formula expresses that cost C3 is determined when a weighted average is equal to zero, the weighted average being a summation of: (1) the total area of coverage of the color graphic objects (represented by "G) multiplied by a First weight W1, (2) the total area of coverage of the low frequency halftone objects (represented by "LFHT") multiplied by a second weight W2, (3) the total area of coverage of the high frequency halftone objects (represented by "HFHT") multiplied by a third weight W3, and (4) the total area of coverage of the solid fill objects (represented by "SF") multiplied by a fourth weight W4. Thus, cost C3 is used to capture pages comprising color objects and that have a smaller approximate file size and only color text or lines arts content. The pages used with cost C3 do not have color images or graphics content and thus are low service cost.

Cost C4 is determined to be the account for the service cost of scanning page 402 (see FIG. 4) when the approximate file size is less than threshold T2 and a weighted average is less than a threshold T3. Specifically, referring to row 318, column 308 of chart 300 for the formula: G*W1+LFHT*W2+HFHT*W3+SF*W4<threshold T3. The formula of row 318, column 308 expresses that cost C4 is determined when a weighted average is less than threshold T3, wherein the weighted average is a summation similar to that as noted above with respect to cost C3. Cost C4 is used to capture color pages that have relatively small file size and some color images or graphics content.

Cost C5 is determined to include the estimated service cost of scanning a color page when that particular page has objects that place the page outside the requirement to use costs of C3 and/or C4 (note that costs C1 and C2 are associated with approximated costs of purely monochrome pages). Referring to row 320, cost C5 is used for all other accounts for the service cost of a page when the approximate file size does not fall below any of thresholds T1 and T2 and the weighted average does not fall below threshold T3. Thus, the approximate file size of the scanned page is greater than or equal to a threshold T2. Cost C5 is used to capture pages having a relatively larger approximate file size and higher image or graphics content, i.e., full color page cost.

Though FIG. 3 and the above noted costs C1-C5 are described with reference to specific thresholds, it should be noted that the above noted thresholds T1-T3 for calculating the service costs C1-C5 for scanning pages are illustrative only, and, therefore, should not be limiting. Generally, several different methods or calculations may be used for the determination of thresholds T1-T3 and/or weight values for determining the service costs/cost function 220 for scanning objects in a page. Also, any number of thresholds T may be used to determine any number of costs C for scanning a page, and, therefore, the determination or calculation of the cost C should not be limited to the thresholds and/or formulas as described herein.

Figure 4:
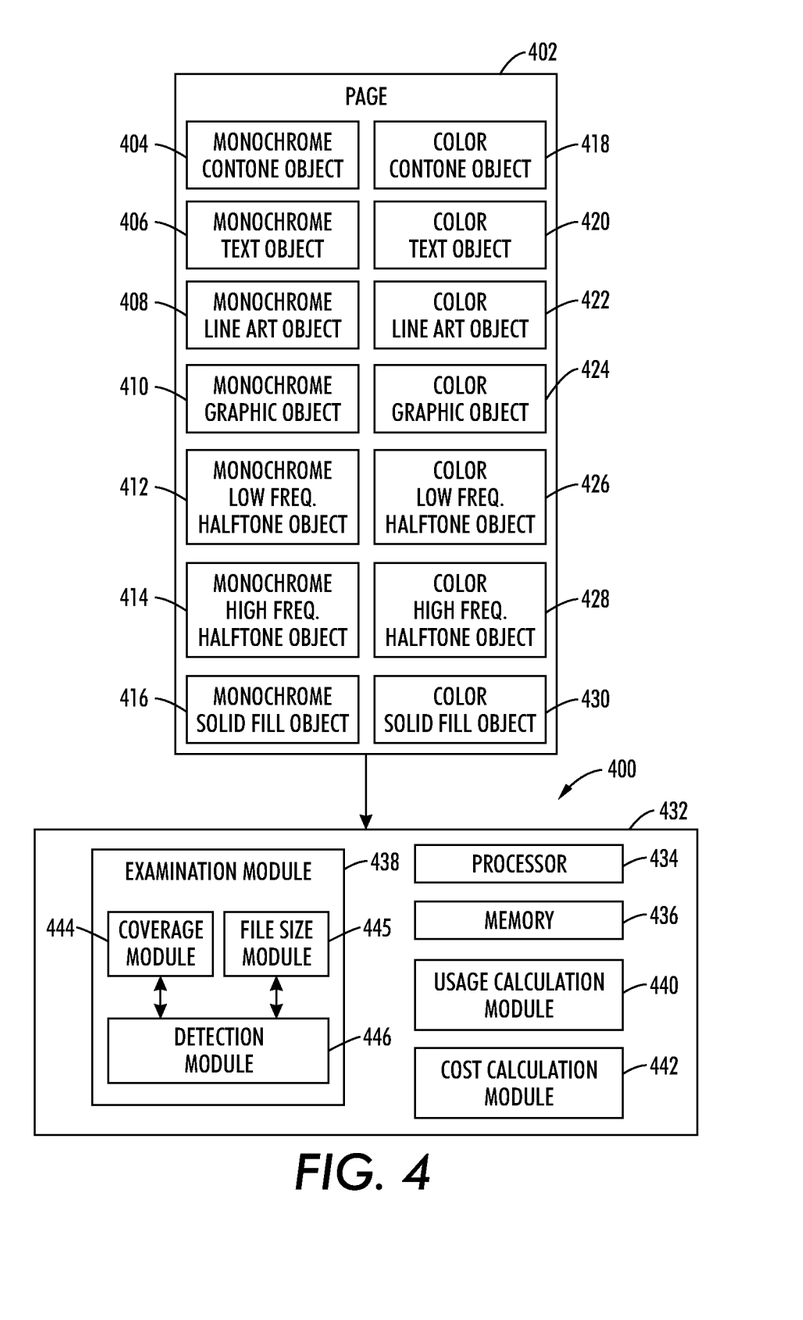
FIG. 4 is a block diagram illustrating a billing system that may be used to bill scanning service costs.

Using the cost function as depicting in chart 300 thus allows for 5 different costs C1, C2, C3, C4, and C5 to be determined for scanning a page. However, referring back to FIG. 2, in an embodiment, method 200 may use an alternative cost function in step 220 that uses quality parameters (e.g., saturation, brightness, contrast, background suppression, etc.) of the various areas of coverage of any detected objects within a page (e.g., page 402).

Once a cost C1-C5 is determined for a page, the cost C1-C5 is generally stored (e.g., such as in a memory or counter/calculating device) for retrieval at a later date. Each cost per page scanned may be stored over a period of time until accessed. For example, when a user calls for service on an output device or MFD, the service technician or engineer may retrieve the cost information from the memory device or counter device for the period of time from the last service, and such information may be used to bill the user or customer for the scanning service costs.

The counter devices (or otherwise) that are pulled by the technician are also used to update the weight value for each object type being scanned by the output device or MFD. For example, the weight value associated with each type of object may be adjusted based on its usage profile over the period of time. For example, referring to the cost function shown in chart 300 of FIG. 3, if a user has scanned a plurality of color solid fill objects (e.g., SF) but less color graphic objects (e.g., "G"), the weight value W1 associated with color graphic objects may be lowered, while the weight value W4 associated with color solid fill objected is raised. Hence, the service cost is also associated and adjusted according to the type of objects scanned and detected, providing the user with a customized method of billing. This is particularly beneficial for a user who, during one period of time scans mostly monochrome objects and during another period of time scans color objects, as the service needs during the first period may require less service (i.e., less billing), while the service needs during a second period may require more service (i.e., higher billing).

The usage profile may also provide customized billing by using records of service requests therewith. For example, if a user has scanned a significant amount of graphics G and high frequency halftone HFHT color objects without any complaints or need for service, but has made a service request only after scanning a smaller amount of solid fill SF objects, it may be noted that rendering and scanning solid fill SF objects are important to the user. Thus, the weight value W4 associated with solid fill SF objects would be weighed higher (i.e., increased) as compared to the other objects.

In both of the above described methods the multi-tier billing costs for scanning will generally remain substantially the same, while the weight values associated with certain objects types are changed or adjusted based on the usage data. Traditional approaches rely on fixed service cost(s) and do not account for the usage profile of the customers; that is, the cost of scanning monochrome and/or color objects in the prior art is approximated by counting a number of pixels, and, generally does not account for how the color pixels are distributed in a page (e.g., how the pixels are distributed and/or clustered), the kinds of objects in the page the pixels are used to form, or the pixel density. Thus, in prior art methods, the calculations of the service costs per page are static and do not track the actual service cost incurred based on composition (e.g., types of objects printed) of the document. The dynamic capability of adjusting the weight value and, hence, the cost for scanning each page, as noted in the method herein described is useful as a plurality of different types of documents (and workflows) are produced (e.g., scanned, printed, copied) in the marketplace.

Further, such a method also provides the capability to warn users or customers of scanning related issues based on historical data from their usage profile. Prior art methods include providing messages (e.g., pop-up window warnings) to users, however, such messages are static and based purely on the scan attribute selection with no correlation to the object types on the scanned page or historical service data. In an embodiment of the present disclosure, the usage profile of the scanned objects may be used to provide warnings to users or customers based on the frequency of service calls relating to a particular file size selected for a particular type of object detected. For example, if a user or customer is scanning a page including halftone content and has selected a file size that is too small (e.g., less than 1 MB), a message (e.g., a pop-up window) may be provided by the output device or MFD that warns the user or customer of the potential image quality loss relative to the original page and, further, suggests to the user or customer a better or optimal file size selection based on the types of objects detected. In this scenario, the message may be based on historical data from the usage profile that suggests that a certain number or a majority of scanning related service calls have been related to scanned pages including halftone content with corresponding file size selections being too small. Thus, the usage profile data may be used to help users or customers to avoid service calls.

Referring to FIG. 4, a billing system 400 having a processing module 432 is shown and may be implemented by using software executable instructions. Additionally or alternatively, billing system 400 and its various modules may include hardware, software, software in execution, firmware, and/or some combination thereof. More specifically, method 200 may be implemented using billing system 400. Billing system 400, in turn, is implemented by a processor 434 and a memory 436 that stores software executable instructions for execution by the processor 434. System 400 also includes an examination module 438, usage calculation module 440, and cost calculation module 442. Examination module 438 may include a coverage module 444, a file size module 445, and detection module 446. Also shown in FIG. 4, is page 402 which illustrates a representative page that billing system 400 may use to determine the service cost associated with the page.

Examination module 438 may examine the content of page 402. The examination may be accomplished using detection module 446 that may detect one or more objects in page 402. Coverage module 444 may determine the approximate area of coverage of a detected object detected by detection module 446. Coverage module 444 may count the number of pixels of the detected objects using techniques such as ripping or auto-windowing, as previously noted. File size module 445 may determine the approximate file size of page 402 (e.g., based on DPI and/or bit depth) using techniques such as auto-windowing and MRC segmentation, as previously noted.

Examination module 438 may operatively communicate with usage calculation module 440 and cost calculation module 442. Usage calculation module 440 may determine the usage profile of each type of detected object 404 through 430 (or otherwise objects detected within another page not depicted), i.e., count or sum the number of times an object is scanned. Cost calculation module 442 may use the cost function described in FIG. 3 to approximate a cost of scanning page 402 using objects 404 through 430 (or otherwise objects detected within another page not depicted). Additionally or alternatively, cost calculation module 442 may use any cost function discussion herein. Also, in an embodiment, processor 434 may be used in addition to or alternative to usage calculation module 440 and/or cost calculation module 442. Memory 436 may be used to store the usage profile information of each type of detected object. Memory 436 may also be used to store the cost calculations made by cost calculation module 442.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of billing for scanning service costs of an output device, the output device adapted to scan documents comprising at least one page, the method comprising: using a computing device operably coupled with the output device to examine content of each page in the documents, the examining comprising: (i) electronically detecting at least one object in the page; (ii) electronically determining a type of the at least one detected object within the page; (iii) electronically determining an approximate page file size of the page and an approximate object file size of the detected object within the page; and (iv) electronically determining an approximate area of coverage of a detected object within the page; using the computing device to calculate a usage profile of each type of detected object; electronically storing the usage profile of each type of detected object in a memory associated with the computing device; and using the computing device to approximate a cost of scanning the page using the at least one detected object, the determined approximate page file size of the page and object file size of the object, the determined approximate area of coverage of the at least one detected object, and a weight value, the weight value being associated with the type of the at least one detected object, wherein the approximate cost of scanning for each page scanned by the output device is determined by the computing device based on an accounting of the page and object file sizes, how pixels of the object are distributed in the page and the detected object and pixel density of the object.

2. The method according to claim 1, further comprising: electronically generating a message to a user of the output device based on at least one of the approximate file size and the stored usage profile.

3. The method according to claim 1, wherein the weight value associated with each type of detected object is adjusted based on the usage profile of the types of detected objects scanned over a period of time.

4. The method according to claim 1, wherein the weight value associated with an object is decreased based on its usage profile.

5. The method according to claim 1, wherein the weight value associated with an object is increased based on its usage profile.

6. The method according to claim 1, wherein electronically detecting the at least one object in the page further comprises electronically detecting at least one color object or at least one monochrome object.

7. The method according to claim 1, wherein the at least one object in the page includes at least one selected from the group consisting of a monochrome contone object, color contone object, monochrome text object, color text object, monochrome line art object, color line art object, monochrome graphic object, color graphic object, monochrome low frequency halftone object, color low frequency halftone object, monochrome high frequency halftone object, color high frequency halftone object, monochrome solid fill object, and color solid fill object.

8. The method according to claim 1, wherein electronically determining an approximate area of coverage of a detected object comprises electronically counting a number of pixels of the detected object.

9. The method according to claim 1, wherein the electronically detecting comprises a micro-detection step and a macro-detection step.

10. The method according to claim 1, wherein the usage profile of each type of detected object is based on a calculated number of times the object is scanned by the output device over a period of time.

11. The method according to claim 10, wherein the period of time is defined as a time period between two service calls by a technician.

12. A billing system for scanning service costs of an output device adapted to scan documents comprising at least one page, the billing system comprising: a computing device electronically coupled with the output device and adapted to process scanned documents, the computing device comprising: an examination module configured to examine content of a page, the examination module comprising: (i) a detection module configured to electronically detect at least one object in the page and a type of the at least one object, (ii) a file size module configured to electronically determine an approximate page file size of the page and an approximate object file size of the detected object within the page, and (iii) a coverage module configured to electronically determine an approximate area of coverage of a detected object within the page; a calculation module configured to calculate a usage profile of each type of detected object; a memory for electronically storing the usage profile of each type of detected object; and a cost calculation module configured to apply a cost function to approximate a cost of scanning the page using the detected object, the determined approximate page file size of the page and object file size of the object, the determined approximate area of coverage of the detected object, and a weight value, the weight value being associated with the type of the at least one detected object wherein the approximate cost of scanning for each page scanned by the output device is determined by the computing device based on an accounting of the page and object file sizes, how pixels of the object are distributed in the page and the detected object and pixel density of the object.

13. The billing system according to claim 12, wherein, upon calculating the scanning service costs over a period of time, the cost calculation module adjusts the weight value associated with each type of detected object based on the usage profile of each type of detected object.

14. The billing system according to claim 12, wherein the output device is a multi-function device adapted to at least one of print, copy, and scan documents.

15. The billing system according to claim 12, wherein the cost function compares the approximate file size of the page to a first predetermined threshold and a weighted average of the approximate area of coverage to a second predetermined threshold to approximate a cost of scanning the page.

16. The billing system according to claim 12, wherein the cost of scanning the page is customized based on the calculated usage profile.

17. The billing system according to claim 12, wherein the detection module detects at least one color object or at least one monochrome object in the page.

18. The billing system according to claim 12, wherein the detection module detects at least one selected from the group consisting of a monochrome contone object, color contone object, monochrome text object, color text object, monochrome line art object, color line art object, monochrome graphic object, color graphic object, monochrome low frequency halftone object, color low frequency halftone object, monochrome high frequency halftone object, color high frequency halftone object, monochrome solid fill object, and color solid fill object.

* * * * *